Oct. 23, 1945.	G. R. ELLIOTT	2,387,653
CONTROL VALVE
Filed Aug. 5, 1943
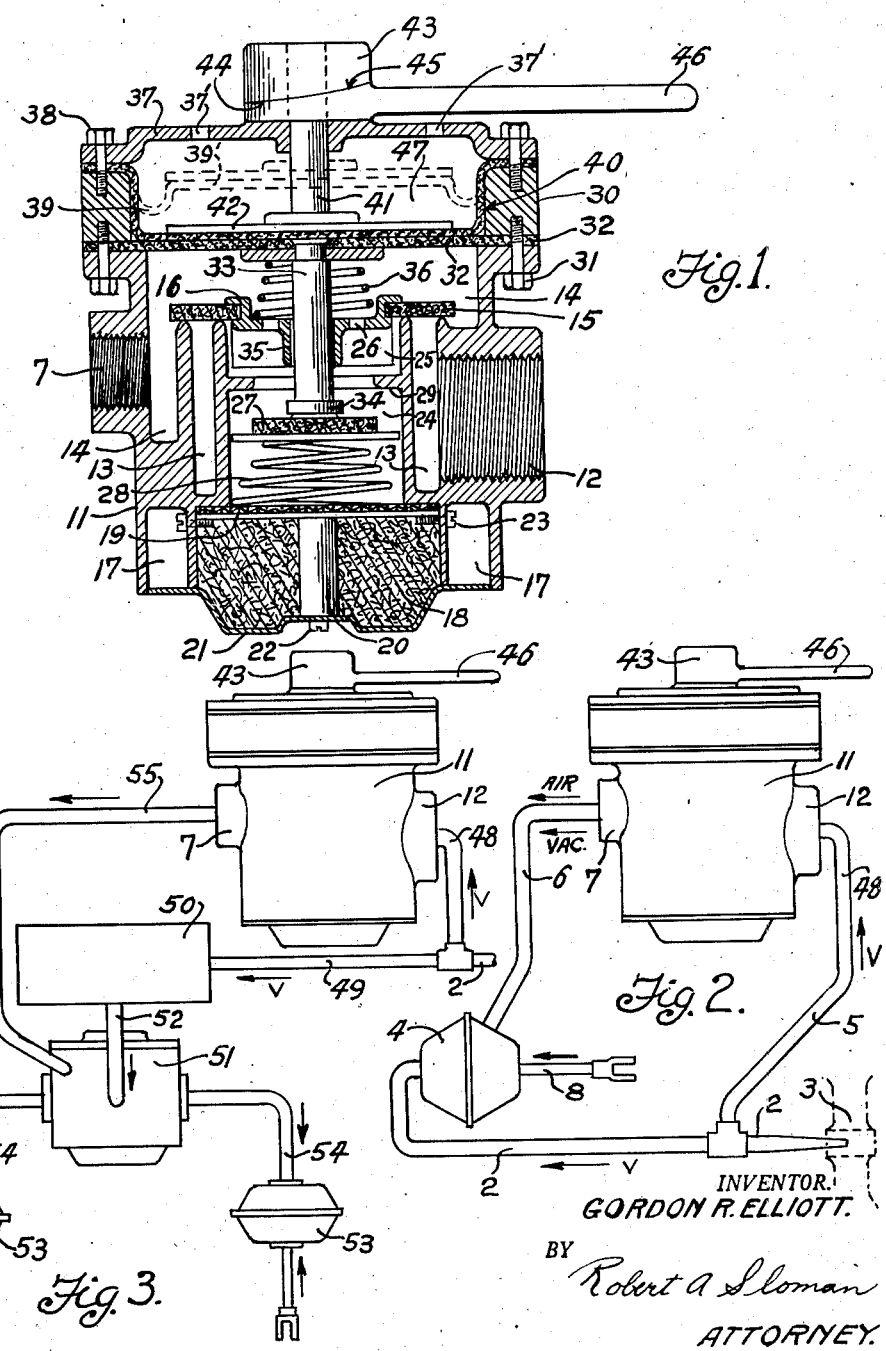
INVENTOR.
GORDON R. ELLIOTT.
BY Robert A. Sloman
ATTORNEY.

Patented Oct. 23, 1945

2,387,653

UNITED STATES PATENT OFFICE 2,387,653

CONTROL VALVE

Gordon R. Elliott, Ferndale, Mich., assignor to Velvac Incorporated, Detroit, Mich.

Application August 5, 1943, Serial No. 497,508

9 Claims. (Cl. 303—54)

This invention relates to control valves, and more particularly to a manually operable air and vacuum control valve for the remote control of vehicle, trailer, truck and tractor vacuum power brakes.

Heretofore control valves of this type have been provided with a plurality of springs for maintaining the proper balance between the air and vacuum chamber control diaphragm, or diaphragms therein.

Inasmuch as such springs are subject to wear, ageing, rust, and other factors bearing upon their resilient functions, it has been found that the proper balancing of the vacuum and air chambers varies with the result that frequent replacement of the entire control valve becomes necessary.

It is the object of the present invention to provide a control valve wherein the balancing chamber is controlled by a self contained vacuum unit provisioned entirely within the control valve housing.

It is the object of the present invention to provide a manually actuated vacuum producing means for effecting a vacuum condition of a desired extent within the control valve balancing chamber. The advantage of the self contained unit over an exterior vacuum source resides in the fact that characteristic rises and falls in the vacuum source would result in undesirable variations in the extent of vacuum within the control valve balancing chamber. By providing a vacuum source entirely within the control valve, the balancing chamber vacuum is subject to no variations except as are manually effected in the operation of the control valve.

It is the further object to provide a combination of elements wherein the control valve is connected directly to the vacuum power chamber of a vehicle brake as for instance the brakes on a tractor or truck.

It is the further object also to provide the combination wherein the control valve is adapted to operate a remote conversion valve on the truck trailer for instance, which in turn controls a separate vacuum communication to the vacuum power brakes thereof.

The present invention therefore relates to the various elements and their combinations as more fully hereafter set out described and claimed in connection with the appended drawing of which—

Fig. 1 is an elevational section of the control valve.

Fig. 2 is a diagrammattic view of the control valve in conjunction with a vacuum suspended power brake system, and Fig. 3 is a diagrammatic view of the control valve in conjunction with a conversion valve and an air suspended power brake system.

It will be understood that the above drawing illustrates merely a preferable embodiment of the invention, and that other embodiments are also contemplated within the scope thereof as set out hereinafter in conjunction with the appended claims.

In the drawing, the valve housing 11 has the lateral threaded opening 12 formed therein for receiving vacuum communication from a suitable source, as for instance, the vacuum taken off the intake manifold of a vehicle internal combustion engine.

Vacuum supplied to the annular chamber 13 formed within housing 11 is adapted for communication with chamber 14 also formed within housing 11, but intermittently cut off therefrom by action of the hollow valve disc member 15 carried by the hollow reciprocable guide 16.

As shown in Fig. 2 in connection with a vacuum suspended power brake system for use on a truck, tractor, a vacuum take-off conduit 2 is joined to the vacuum take-off at the vehicle intake manifold 3 shown fragmentarily in dotted lines.

Hose 2 provides vacuum communication to one side of the vehicle brake chamber 4 while a secondary hose 5 provides vacuum communication to the vacuum opening or port 12 in the control valve housing 11. Opening 12 in communication with chamber 13 is thus adapted for providing vacuum to chamber 14.

Chamber 14 is adapted for communication by outlet opening 7 and by a suitable conduit 6 to the power chamber 4 of the vehicle brakes, so that when vacuum communication is established to chamber 14, vacuum is available through conduits 2 and 6 for maintaining the brakes in released condition.

On the other hand application of the brakes is obtained by supplying air through conduit 6 to the vacuum brake chamber 4, being delivered thereto also from valve chamber 14. Air is supplied to valve housing 11 through air openings 17 and through air filter 18 retained within housing 11 between screen assembly 19, filter plate assembly 20, and cover 21, said cover being secured to assembly 20 and housing 11 by a suitable bolt 22. Screen assembly 19 is retained in housing 11 by studs 23; and filtered air travels upwardly into chambers 24 and 25, being adapted for communication into chamber 14 through the openings 26 in guide member 16.

In normal braking position the seat assembly 27 resiliently positioned upon coil spring 28 is unseated with respect to the inwardly projecting annular valve seat 29, formed within housing 11, whereby air is free to pass upwardly through openings 26 in guide 16 and into chamber 14 for communication through conduit 6 to brake chamber 4.

It is noted also that during actuation of the brakes disc 15 is seated over the annular chamber opening 13 which communicates with the vacuum supply through inlet opening 12, effectively closing off vacuum communication to chamber 14 and brake chamber 4.

The intermediate housing member 30, and housing 11 to which it is secured by studs 31 have interposed and restrained therebetween flexible diaphragm 32. Stem 33 centrally disposed within housing 11 and suitably secured to diaphragm 32, depends downwardly therefrom and slidably through the central opening in guide member 16.

Annular collar 34 at the bottom of stem 33 is not only adapted to operatively engage seat assembly 27 for downwardly unseating the same relative to annular valve seat 29 against the action of spring 23, but also is adapted to engage the lower hollow portion 35 of guide 16 for upwardly unseating disc 15 with respect to chamber 13.

It is noted that the unseating of disc 15 is against the action of coil spring 36 which is interposed between guide 16 and diaphragm 32. Thus it is clear that downward movement of stem 33 unseats valve disc 27, while sufficient upward movement of stem 33 unseats disc 15.

The housing cover member 37 with air openings 37' and the intermediate housing 30 to which it is secured by studs 38, have interposed therebetween the flexible diaphragm 39. Intermediate housing 30 has the central opening 40; and flexible diaphragm 39, adapted to engage diaphragm 32, also engages and coincides substantially in curvature with the inner surface of said intermediate housing. Thus it is seen that in the solid line position of diaphragm 39 there is, for practical purposes, a limited amount of air between the two diaphragms 39 and 32. It is understood that both diaphragms are air-tightly sealed within valve housing 11, 30, 37, and furthermore that an air-tight relation exists between the two diaphragms. However while diaphragm 39 substantially follows the curvature of hollow housing member 30, it is intended that some air space be provided between said members, and particularly the annular air space shown in Fig. 1 between member 30 and diaphragms 32 and 39.

The amount of air between diaphragms 32 and 39 is relatively small, depending upon the desired movement of stem 41 and diaphragm 39. For a relatively greater movement the amount of air would be greater in order to provide an effective balancing chamber between diaphragms 32 and 39.

Stem 41 upwardly projecting from diaphragm 39 and through the housing cover 37 is suitably secured by disc 42 to said diaphragm, said disc being adapted to cause upward movement of said diaphragm upon upward translation of stem 41.

Non-rotatable member 43 secured upon the upper end of stem 41 has a cam surface 44 adapted to be operatively engaged by the corresponding cam surface 45 carried by the manually rotatable handle 46.

Thus rotatable movement to a greater or lesser degree will cause a greater or lesser upward movement of member 43 and the stem 41 secured thereto. Thus the maximum pivotal movement of handle 46 causes a corresponding maximum upward movement of diaphragm 39 until it assumes the dotted line position indicated at 39'. Thus intermediate pivotal movement of handle 46 will cause intermediate movement of diaphragm 39 between the two extreme positions of said diaphragm as shown in Fig. 1 of the drawing.

With diaphragms 32 and 39 initially in engaging relation it is seen that upward movement of diaphragm 39 will provide a balancing vacuum chamber 47 between the two diaphragms. The extent of this vacuum or the extent to which the air pressure therebetween is reduced will depend proportionately upon the extent of upward movement of diaphragm 39.

For instance maximum vacuum is provided within balancing chamber 47 when diaphragm 39 is displaced to its maximum upward position indicated by the dotted line position 39'. Intermediate degrees of vacuum are correspondingly produced by corresponding intermediate positions of diaphragm 39, all of which are governed by the extent of manual rotary movement of handle 46 by the operator of the vehicle.

Flexible diaphragm 32 bounding the lower side of chamber 47 is thus adapted for movement relative to the upward positioning of diaphragm 39', with the extent of such movement into chamber 47 being governed by the extent of vacuum differential or pressure differential between chambers 47 and 14.

*Operation*

During brake actuation disc 15 is seated over vacuum chamber 13, and with disc 27 unseated, air is in chamber 14 and in communication with the vehicle power brake chamber 4 through port 7 and conduit 6 therebetween.

Upon manual pivotal movement counter-clockwise, for instance, of handle 46 with diaphragm 39' elevated creating a vacuum condition in chamber 47, and with air in chamber 14, it is seen that the pressure differential between said chambers causes upward movement of diaphragm 32 and stem 33 causing disc 27 in the first place to seat itself by action of coil spring 28, upon the valve seat 29 shutting off chamber 14 from further supply of air from chamber 24.

In the second place valve disc 15 is unseated by collar 34 engaging the lower portion 35 of guide 16, as stem 33 travels upwardly so that now vacuum communication from the vacuum source 3 to chamber 13 is established with chamber 14.

Vacuum now built up in chamber 14 is communicated by conduit 6, Fig. 2, above mentioned, to the vacuum power brake chamber 4 of the vehicle for releasing the brakes, brake release being accomplished by the communication of vacuum on both sides of chamber 4, i. e. through conduits 2 and 6, which is the characteristic brake release condition in a vacuum suspended system. It is seen that the extent of pivotal movement of handle 46 counter-clockwise can vary the promptitude of upward movement of stem 33 for providing vacuum communication to said power brake chamber 4, and can also vary the unseated spaced relation between disc 15 and chamber 13, whereby the time for developing full vacuum in chamber 14 may be regulated.

At the moment however the handle 46 is actuated in a counter-clockwise direction a pressure differential is created between chambers 47 and 14, which differential is gradually neutralized as vacuum is built up in chamber 14. As soon as equilibrium is established between chambers 47 and 14 diaphragm 32 will again return to its neutral position as shown in solid lines in Fig. 1 of the drawing.

Consequently stem 33 floats downwardly permitting valve 15 under action of spring 36 to again seat itself over the opening of vacuum chamber 13. At this point of equilibrium the power brakes are still released, but valve disc 27 is still seated.

The vacuum power brakes will not be applied or partly applied until handle 46 is returned by a clockwise movement to its initial position, or partially returned permitting diaphragm 39 to return to an intermediate position or to its initial position, again creating a differential of pressure on opposite sides of diaphragm 32. This differential due to decreased or zero vacuum above diaphragm 32 and with vacuum in chamber 14 causes further downward movement of diaphragm 32 and stem 33 in turn causing disc 27 to unseat permitting air to enter chamber 14.

Air in chamber 14 conducted to the power brake chamber 4 through port 7 and conduit 6 above mentioned, effects application of the brakes, and at the same time diaphragm 32 under pressure of the air in chamber 14 is returned upwardly to its neutral position as shown in Fig. 1, whereby again there is equilibrium between chamber 14 and the chamber above the two diaphragms 32 and 39.

It is seen that the vacuum chamber 47 is a balancing chamber for determining the amount, degree and direction of longitudinal movement of diaphragm 32 and stem 33. If the vacuum supply to such a chamber were effected exteriorly of the chamber housing there would exist the disadvantage that the extent of such vacuum therein would vary in accordance with the rise and fall of the vacuum supply.

By manually creating vacuum within balancing chamber 47, independent of any exterior vacuum source, a more highly dependable and promptly responsive valve is provided. By employing handle 46 the degree of vacuum within balancing chamber 47 can be regulated which in turn directly effects the action and movement of diaphragm 32 in controlling the vacuum power brakes and their release.

With reference to Fig. 2 in brake release condition, handle 46 is pivoted manually counter-clockwise, looking at the control valve from the top thereof. Diaphragm 39 is elevated to its dotted line position 39' as shown in Fig. 1, establishing the vacuum balancing chamber 47. Vacuum in chamber 47 and air in chamber 14 also causes upward movement of diaphragm 32 resulting in the upward unseating of disc 15 establishing vacuum communication to chamber 14, port 7, conduit 6 and the brake chamber 4.

Thus with vacuum through conduits 6 and 2 the power brake actuating piston within chamber 4 is centrally suspended therein maintaining the vehicle brakes in released condition.

To apply the brakes however, handle 46 is actuated in a clockwise direction permitting diaphragm 39' to return towards or to its solid line position 39, eliminating the vacuum balancing chamber 47. Thus with vacuum in chamber 14, diaphragm 32 drops downwardly unseating air control disc 27, air is supplied to chamber 14, port 7, conduit 6 to one side of brake chamber 4.

Thus with a vacuum condition on the other side of the piston within brake chamber 4, it is seen that a translation to the left of piston rod or brake actuating lever 8 is effected for applying the vehicle brakes.

To again release the brakes handle 46 is now rotated manually in a counter-clockwise direction to produce the brake release condition hereinabove fully described.

Fig. 3 illustrates a slightly different arrangement of an air suspended power brake system often used in conjunction with the truck, trailer brakes. The vacuum source from the intake manifold 3 is connected through conduit 48 to port 12 of the control valve housing 11. Vacuum communication is also provided through conduit 49 to the vacuum reserve tank 50 which joins the remote conversion valve 51 by conduit 52.

The two brake operating chambers 53 are joined to conversion valve 51 by conduit 54 for effecting operation and release of the trailer power brakes. In brake release condition air is available on both sides of the operating pistons within said brake chambers, said braking arrangement being regarded as an air suspended system.

To apply the brakes vacuum is supplied from vacuum tank 50, through conversion valve 51 and conduits 54. In this arrangement control valve 11 is employed merely for effecting operation of the conversion valve 51, the detail and construction of which is omitted herein. Vacuum or air communication from control valve 11 is supplied to conversion valve 51 for operating the same through conduit 55 in the manner fully described above in connection with providing air or vacuum communication out through port 7 and conduit 6 from control valve 11.

Having described my invention, reference should now be had to the claims which follow for determining the scope thereof.

I claim:

1. A control valve comprising a housing having a brake control air and vacuum outlet chamber, an air chamber and a vacuum chamber adapted for alternate communication with said outlet chamber, valve means for effecting said alternate communications, a moveable diaphragm disposed through said housing and joined to said valve means, and manually operable means including a second diaphragm in said housing for creating a vacuum between said diaphragms governing movements of the latter for establishing communication between said vacuum and outlet chambers, and for eliminating said vacuum for establishing said communication between said air and outlet chambers.

2. In a control valve adapted for alternately supplying air and vacuum to a brake chamber, a housing having an air chamber and a vacuum chamber, valve means for alternately opening and closing off said chambers from said brake chamber, a moveable diaphragm disposed through said housing and joined to said valve means, and manually operable means including a second diaphragm in said housing for creating a vacuum between said diaphragms governing movements of said first diaphragm for opening said vacuum chamber and closing said air chamber, and for eliminating said vacuum for opening said air chamber and closing said vacuum chamber.

3. In a control valve for alternately supplying air and vacuum to a brake chamber, a housing having an air chamber and a vacuum chamber, valve means for alternately opening and closing off said chambers from said brake chamber, moveable means controlling movement of said valve means, and manually operable means in engagement with said moveable means, adapted for movement relatively thereto for creating a vacuum in the chamber therebetween, governing movement of said moveable means to effect opening of said vacuum chamber, and for further relative movement to eliminate said vacuum to effect opening of said air chamber.

4. In a control valve for alternately supplying air and vacuum to a brake chamber, a housing, a diaphragm disposed through said housing adapted for movement therein, valve means carried by said diaphragm for controlling communication through said housing alternately of an air source and a vacuum source, and a second diaphragm in engagement with said diaphragm adapted for movement relatively thereto for creating a vacuum in the chamber therebetween, governing movement of said valve means, causing upward movement of said first diaphragm permitting vacuum communication through said housing and adapted for further relative movement eliminating said vacuum, allowing downward movement of said first diaphragm permitting air communication through said housing.

5. In a control valve for alternately supplying air and vacuum to a vehicle brake chamber, a housing, a diaphragm disposed through said housing adapted for movement therein, valve means carried by said diaphragm to control on upward movement communication through said housing of a vacuum source, and on downward movement therein to alternately control communications through said housing of an air source, a second diaphragm disposed through said housing in engagement with said first diaphragm, adapted for manually controlled movement relatively thereto creating a vacuum therebetween to cause upward movement of said first diaphragm, and for further movement relative thereto eliminating said vacuum permitting downward movement of said first diaphragm.

6. In a control valve for alternately supplying air and vacuum to a brake chamber, a housing having an air chamber and a vacuum chamber, moveable valve means adapted to alternately seal said chambers from said brake chamber, a moveable diaphragm disposed through said housing and joined to said valve means, a second moveable diaphragm in said housing in loose engaging relation with said first diaphragm, and manually operable means joining said second diaphragm adapted to cause movement thereof relatively away from and toward said first diaphragm for first creating and then eliminating a vacuum therebetween to effect reciprocable movements of said valve means.

7. In a control valve for alternately supplying air and vacuum to a brake chamber, a housing having an air chamber and a vacuum chamber, moveable valve means adapted to alternately seal said chambers from said brake chamber, a moveable diaphragm disposed through said housing and joined to said valve means, a second moveable diaphragm in said housing in engaging relation with said first diaphragm, and manually operable means joining said second diaphragm adapted to cause movement thereof relatively to said first diaphragm for creating a vacuum in the chamber between said diaphragms, into which said first diaphragm is moveable, and also adapted to cause further relative movement of said second diaphragm for eliminating said vacuum permitting movement of said first diaphragm in the opposite direction.

8. In a control valve a housing having air, vacuum, and outlet chambers, moveable valve means adapted on upward movement to seal off said air chamber and join said outlet and vacuum chambers, and on first stage downward movement seal off said vacuum chamber from said outlet chamber, and on second stage downward movement join said air and outlet chambers, a movable diaphragm disposed through said housing and joined to said valve means, a second moveable diaphragm in said housing in loose engaging relation to said first diaphragm, and manually operable means joining said second diaphragm adapted to cause movement thereof relative to said first diaphragm for creating a vacuum in the chamber between said diaphragms into which said first diaphragm is upwardly moveable, with first stage downward movement of said valve means being effected upon an equilibrium being established between said vacuum and outlet chambers, said manually operable means being adapted to cause further relative movement of said second diaphragm for eliminating said vacuum and causing second stage downward movement of said first diaphragm.

9. In a control valve for alternately supplying air and vacuum to a vacuum suspended power brake chamber, a housing having air and vacuum chambers, a diaphragm actuated regulating valve stem therein for alternately sealing said chambers from said brake chamber, and moveable means in engagement with said stem actuating diaphragm adapted for movement relatively thereto for creating a vacuum between said moveable means and said diaphragm, effecting upward movement of said diaphragm for supplying vacuum to said brake chamber, said moveable means being adapted for further relative movement to eliminate said vacuum permitting downward movement of said diaphragm for supplying air to said brake chamber.

GORDON R. ELLIOTT.